United States Patent
Wallack

(10) Patent No.: US 6,748,110 B1
(45) Date of Patent: Jun. 8, 2004

(54) OBJECT AND OBJECT FEATURE DETECTOR SYSTEM AND METHOD

(75) Inventor: Aaron Wallack, Natick, MA (US)

(73) Assignee: Cognex Technology and Investment, Mt. View, CA (US)

( * ) Notice: Subject to any disclaimer, the term of this patent is extended or adjusted under 35 U.S.C. 154(b) by 636 days.

(21) Appl. No.: 09/708,431

(22) Filed: Nov. 9, 2000

(51) Int. Cl.[7] .................. G01N 21/00; G06K 9/34; G06K 9/48
(52) U.S. Cl. .................. 382/173; 382/199; 382/204; 382/286; 348/125; 356/237.1
(58) Field of Search ................ 382/173, 199, 382/203, 273, 288, 204, 286; 348/125; 356/237.1

(56) References Cited

U.S. PATENT DOCUMENTS

| | | | | |
|---|---|---|---|---|
| 4,396,903 A | * | 8/1983 | Habicht et al. | 382/103 |
| 4,490,848 A | * | 12/1984 | Beall et al. | 382/152 |
| 4,876,728 A | * | 10/1989 | Roth | 382/153 |
| 5,179,419 A | * | 1/1993 | Palmquist et al. | 356/73.1 |
| 5,309,486 A | * | 5/1994 | Lichauer et al. | 376/248 |
| 5,371,690 A | * | 12/1994 | Engel et al. | 382/151 |
| 5,588,068 A | * | 12/1996 | Longest et al. | 382/141 |
| 5,845,007 A | * | 12/1998 | Ohashi et al. | 382/199 |
| 5,862,249 A | * | 1/1999 | Jang et al. | 382/132 |
| 5,872,870 A | * | 2/1999 | Michael | 382/291 |
| 5,917,935 A | * | 6/1999 | Hawthorne et al. | 382/149 |
| 6,167,150 A | * | 12/2000 | Michael et al. | 382/149 |
| 6,539,106 B1 | * | 3/2003 | Gallarda et al. | 382/149 |

OTHER PUBLICATIONS

Gonzalez et al, Digital Image Processing, Addison–Wesley Publishing Company, 1993, p 429.*

IEEE Transactions on Pattern Analysis and Machine Intelligence, "A Robust Snake Implementation; a Dual Active Contour", Steve R. Gunn and Mark S. Nixon, vol. 19, No. 1, Jan. 1997.

IEEE Transactions on Pattern Analysis and Machine Intelligence, "Dynamic Programming for Detecting, Tracking, and Matching Deformable Contours", Davi Geiger, Alok Gupta, Luiz A. Costa and John Viontzos, vol. 17, No. 3, Mar. 1995.

* cited by examiner

Primary Examiner—Bhavesh M. Mehta
Assistant Examiner—Christopher Sukhaphadhana

(57) ABSTRACT

A system and method for object inspection detects and reports object and/or object feature shapes from an acquired image of an inspected sample-object using both edge-based and grey level-based data. Such systems and methods are particularly useful for detecting objects and/or object features whose appearances are relatively unknown prior to inspection.

18 Claims, 5 Drawing Sheets

OBJECT AND OBJECT FEATURE DETECTOR SYSTEM AND METHOD

COPYRIGHT NOTICE

This patent document contains information subject to copyright protection. The copyright owner has no objection to the facsimile reproduction by anyone of the patent document or the patent, as it appears in the U.S. Patent and Trademark Office files or records, but otherwise reserves all copyright rights whatsoever.

1. Field of the Invention

This invention relates to inspection systems and methods for machine vision applications, and more particularly relates to techniques and systems that perform object feature detection and analysis.

2. Background

The simplest kinds of images that can be used for machine vision are simple two-dimensional shapes or "blobs". Blob analysis is the detection and analysis of two-dimensional shapes within images. Blob analysis can provide a machine vision application with information about the number, location, shape, and orientation of blobs within an image, and can also provide information about how blobs are topologically related to each other.

Since blob analysis is fundamentally a process of analyzing the shape of a closed object, before blob analysis can be performed on an image, the image is segmented into those pixels that make up the blob being analyzed, and those pixels that are part of the background. Images used for blob analysis generally start out as grey-scale images of scenes. While it might be easy for a human observer to identify blobs or objects within the scene, before blob analysis can analyze an image, each pixel in the image is assigned as an object pixel or a background pixel. For example, object pixels may be assigned a value of 1, while background pixels are assigned a value of 0.

A number of techniques can be used to segment images into object pixels and background pixels. Such techniques include hard thresholding and soft thresholding segmentation techniques, pixel mapping and analysis using threshold images. However, when blob analysis of the resulting segmented image is performed, the results of the analysis are often degraded by spatial quantization error. Spatial quantization error results from the fact that the exact edge of an object in a scene rarely falls precisely at the boundary between two pixels in an image of that scene. The pixels in which the edge of the blob falls have some intermediate pixel value. Depending on how much of the object lies on the pixel, the pixel is counted as an object pixel or a background pixel. As a result, a very small change in the position of a blob can result in a large change in the reported position of the blob edge.

Spatial quantization error can affect the size, perimeter, and location that are reported for a blob. The severity of spatial quantization errors depends on the ratio of perimeter to area in the image; the greater the ratio of perimeter to area, the greater the effect of the errors. Thus, spatial quantization error increases with ratio of blob perimeter to blob area. Edges that are aligned with the pixel grid, such as those of rectangles, tend to produce systematic reinforcing errors, while other edges, such as those of round objects, tend to produce random canceling errors.

Once an image has been segmented into object pixels and background pixels, connectivity analysis must be performed to assemble object pixels into connected groups of object pixels or blobs. There are three types of connectivity analysis: whole image connectivity analysis, connected blob analysis and labeled connectivity analysis.

Connected blob analysis uses connectivity criteria to assemble the object pixels within the image into discrete, connected blobs. Conventionally, connectivity analysis is performed by joining all contiguous object pixels together to form blobs. Object pixels that are not contiguous are not considered to be part of the same blob.

Once an image has been segmented, and the blob or blobs have been located and identified, an application can begin to consider information about the blob or blobs. A blob is an arbitrary two-dimensional shape. The shape of a blob can be described using a number of different measures. The measures that blob analysis provides may include geometric properties, non-geometric properties and topological properties.

Connected blob analysis relies on grey-level thresholds (and possibly morphological operations) to segment an image into blob and non-blob areas. One use of connected blob analysis involves an operator setting a "hard" threshold. Such a threshold can be effective when the desired feature's grey-level differs significantly from the background, and/or the background and blob have uniform intensity. Connected blob analysis runs into problems when either the background or the blob are textured. Non-uniform intensity can also cause problems. Furthermore, the conventional connected blob analysis does not provide a Within-Group-Variance (WGV) strategy to automatically compute the threshold.

Various forms of blob analysis is routinely performed by conventional machine vision inspection systems. Conventional machine vision inspection systems come in two varieties: those in which the shape of defects with respect to a known pattern (whether edge data or grey-level data) is known, and "blank scene inspection", in which the shape of objects and/or object features is unknown until runtime. Blank scene inspection can involve two different techniques: detecting unexpected edges and detecting pixels with inappropriate grey-levels.

The former technique, detecting unexpected edges, takes advantage of known background information to ignore "expected edges". The unexpected edges are collected into separate features, and the tool provides measurements about each feature. Edge detection involves picking magnitude thresholds and/or edge chain length thresholds. One problem of edge-based "blank scene" machine vision systems occurs when the edges do not form a closed connected boundary. In this case, it is difficult to guarantee that the correct edges have been joined into boundaries.

The latter technique, detecting pixels with inappropriate grey-levels, is a form of blob analysis.

Both grey level-based techniques and edge-based techniques have advantages and disadvantages. Conventional blob analysis inspection tools suffer significant drawbacks when detecting objects and/or object features whose appearance is relatively unknown until runtime.

For example, some conventional blob analysis techniques are too fragile because they rely directly on grey-levels and grey-level thresholds. Although grey level-based methods always provide a region and a closed boundary, it is often difficult to select a good threshold and the selected region may not be the region of interest. Furthermore, if the threshold is automatically computed using the image, repeated acquires on the image data may induce different thresholds, and the computed region may fluctuate.

Alternatively, conventional edge detection tools that use edge chains do not necessarily form closed connected boundary contours. Edges are usually more stable with respect to illumination and scene changes than grey level measures. Furthermore, edge information is completely determined from the local neighborhood, not global information. However, edge boundaries are not guaranteed to be closed contours, and edges can disappear if the transition becomes too dim. As a result, both the technique of detecting unexpected edges and the technique of detecting pixels with inappropriate grey levels have deficiencies.

SUMMARY OF THE INVENTION

The present invention is provided to improve object or object feature (e.g., character) recognition techniques. More specifically, improved methods are presented to overcome these limitations by providing systems and methods for visual inspection designed to detect and report object and/or object feature shapes from an acquired image of an inspected sample-object using both edge-based and grey level-based data. The exemplary embodiment of the invention is particularly useful for detecting objects and/or object features whose appearances are relatively unknown until runtime.

In one exemplary embodiment, the blob boundary information and edge-based information are processed so that detected object and/or feature data includes the edge chain data whenever they are sufficiently close to the blob boundary data. Otherwise, if there are no nearby edges, that exemplary embodiment may use the blob boundary data.

BRIEF DESCRIPTION OF THE DRAWINGS

The benefits of the present invention will be readily appreciated and understood from consideration of the following detailed description of an exemplary embodiment of this invention, when taken with the accompanying drawings, in which similar numbers represent similar elements and.

DETAILED DESCRIPTION OF EXEMPLARY EMBODIMENT

While the present invention will hereinafter be described in connection with an exemplary embodiment thereof, it should be understood that it is not intended to limit the invention to that embodiment. On the contrary, it is intended to cover all alternatives, modifications and equivalents as may be included within the spirit and scope of the invention as defined by the appended claims.

Methods and systems designed in accordance with the exemplary embodiment of the invention combines the use of blob boundary information (grey level-based) and edge-based information. In accordance with the exemplary embodiment of the invention, object and/or object feature detection uses the edge chains whenever they are "sufficiently close" to the blob boundary; otherwise, if there are no nearby edges, the blob boundary information is used for object and/or object feature detection.

For reference and clarification of the explanation of the exemplary embodiment of the invention, the following explanation of various terms is provided. Morphology is a process of altering the shapes of regions by applying arithmetic operators to neighborhoods of pixels within an image. Relative thresholding involves defining a threshold value relative to the distribution of pixel values within an image. Run-length encoding (RLE) is a data-compression technique that compresses runs of bytes with the same value by storing them as a run length and a value.

The area of a blob may be defined as the sum of the weighted pixel values for every nonzero pixel in the blob. The perimeter of a blob is the length of the outside edge of the blob. A blob's perimeter may be calculated by counting the number of pixel edges between pixels with nonzero values and pixels with values of 0. Because computing the perimeter in this way tends to produce a perimeter that is larger than the actual blob perimeter, a correction factor may be applied to the perimeter.

Figure 1:
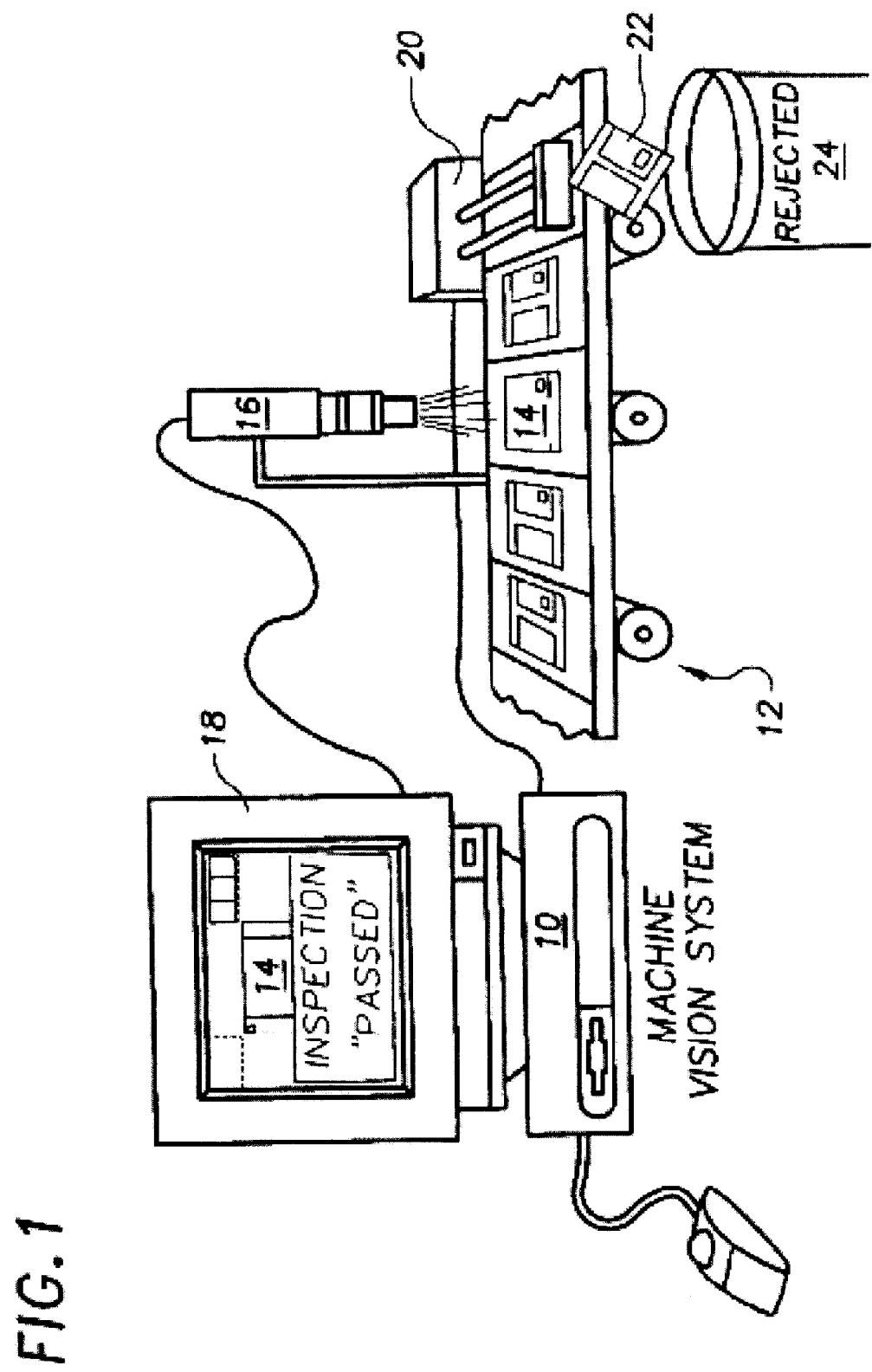
FIG. 1 is an illustration of an exemplary machine vision inspection system that may be implemented in conjunction with the exemplary embodiment of the invention.

Referring to FIG. 1, in accordance with the present invention, there is provided a visual inspection system that can be employed by, for example, a machine vision system for aid in making decisions and providing information about objects in an inspection process such as commonly occur in automated manufacturing. For example, the visual inspection system can be employed in a machine vision system 10 for a manufacturing line such as a manufacturing line 12, as shown in the figure. Using the inspection system, sample-objects 14 can be inspected for compliance with metrics such as size, shape, or the presence of defective characteristics such as erroneous sizing, extraneous printing, etc.

Image(s) of the sample-objects 14 is obtained by camera 16 which is, for example, a CCD camera, connected to the vision system for conversion by the machine vision system 10 to a digital representation, e.g., a greyscale representation, of the sample-object image. The machine vision system 10 can include a display monitor 18 or other means for displaying the acquired sample-object image for a manufacturing line operator. After determining the inspection data of the sample-object 14 under inspection, the machine vision system can provide information about the sample-object's position, geometry, size, or other characteristics.

The machine vision system 10 may, for example, determine if the sample-object under inspection meets quality control standards with regard to size, or inspection features, etc. These standards can be "taught" to the vision system during the Training mode, by way of producing training templates from examples of sample-objects that meet any established visual inspection quality criteria. The machine vision system 10 can then compare a questionable sample-object under inspection against its pre-trained templates during Run-time Inspection mode, in some manner, to determine if the sample-object satisfies the inspection criteria.

In this regard, it should be appreciated that the edge-based object/feature detection process provided in the systems and methods designed in accordance with the exemplary embodiment may be used to provide Training mode sample-object image-data. Therefore, the alignment and inspection process may be performed as part of the training process wherein, templates or models are created. It is also foreseeable that, during a Training mode, the machine vision system may work in cooperation with a line operator or other individual to produce training templates. However, it should be understood that the machine vision system 10 might also perform automated training template production.

Additionally, the object/feature detection process may be performed as part of Run-time Inspection Mode, in which a sample-object currently under inspection is compared with a sample-object template or model. It should also be appreciated that, during Run-time Inspection mode, the machine vision system 10 may work as an automated system, with little or no control necessary by a line operator. However, it should be appreciated that, during Run-time Inspection mode, the machine vision system 10 may interact with a line operator so as to allow the line operator to control any or all of timing of acquiring the sample-object image and subsequent determination of whether the generated inspection results are acceptable.

During Run-time Inspection mode, if the vision system ascertains that the sample-object under inspection satisfies inspection standards, an indication of such a condition can be provided on the display 18 as, e.g., the word "Passed," or can be provided to an operator or automatic indicator on the assembly line in another fashion such as recording into a data log. Alternatively, no indication other than the continuation of the sample-object to later stages of an assembly process may be provided. If the vision system 10 ascertains that a sample-object under inspection does not meet the standard, a mechanical diverter 20 as shown in FIG. 1, connected to the vision system, can be signaled to remove a faulty sample-object 22 from the line when the faulty sample-object 22 is conveyed to the location of the diverter. The diverter might move the faulty sample-object off of the line and into, e.g., a storage receptor 24 for rejected sample-objects. As will be recognized by those skilled in the art, many alternative object inspection and manipulation functions can be provided in a manufacturing line machine vision system like that of FIG. 1.

Figure 2:
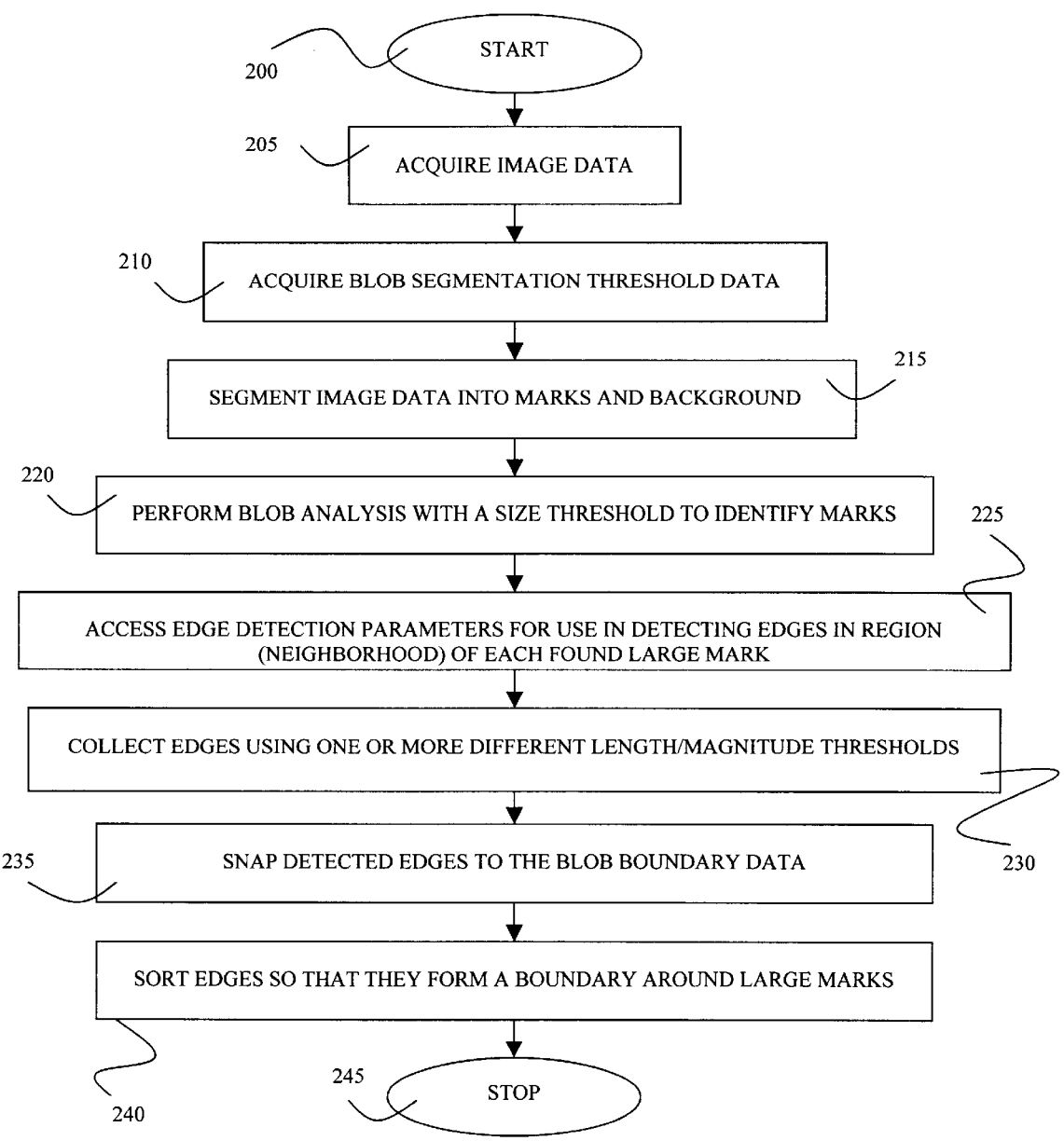
FIG. 2 is a flow chart illustrating the flow of operations performed according to an inspection method designed in accordance with the exemplary embodiment of the invention.
Figure 3:
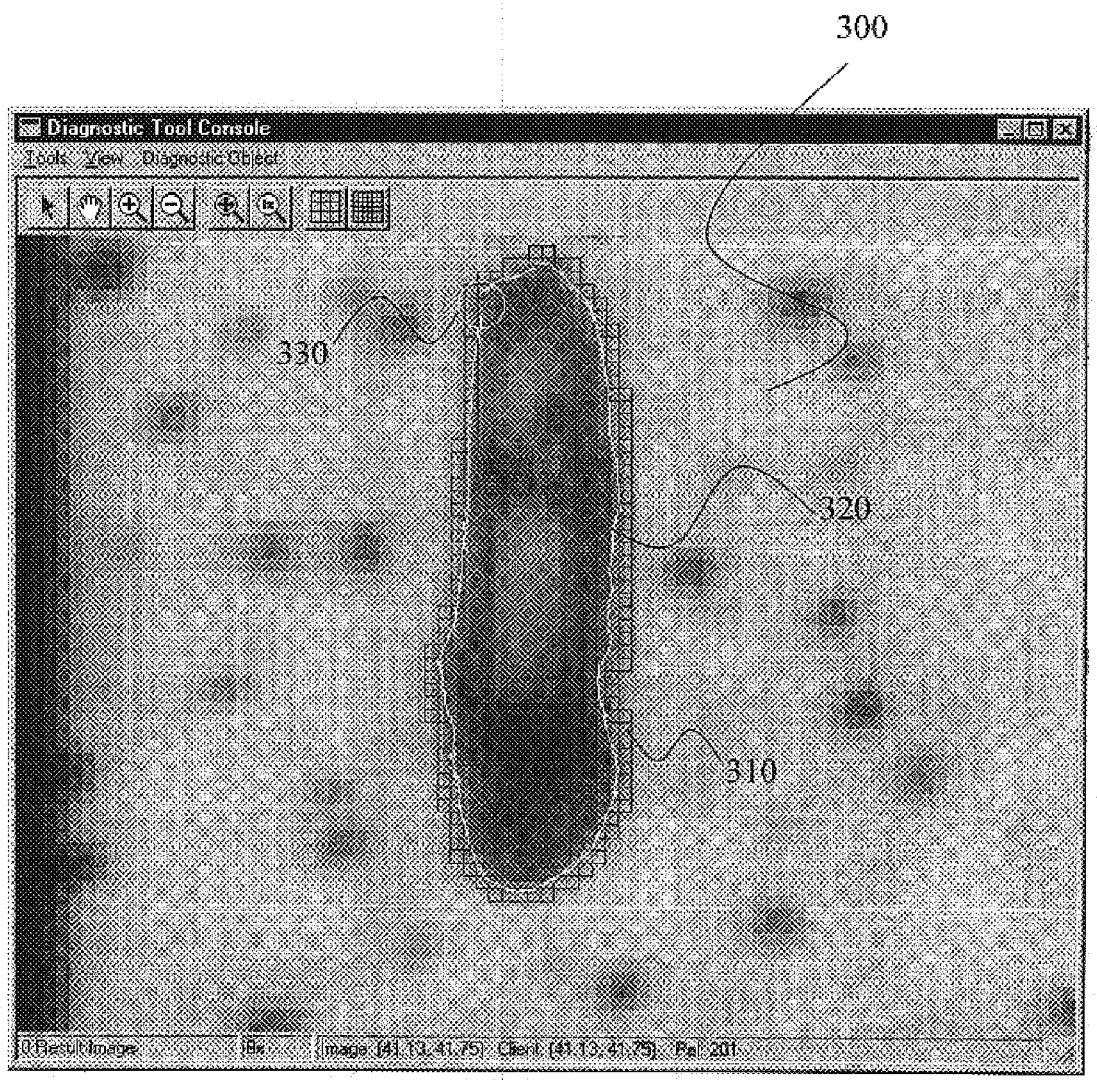
FIG. 3 is an illustration of image data produced in accordance with the exemplary embodiment of the invention.

A method of performing object and/or object feature detection in accordance with the exemplary embodiment of the invention is illustrated in FIG. 2. According to the exemplary embodiment of the invention, blob analysis is performed by running grey-scale connectivity analysis, "true peaked" edge detection and matching the edges to the blob boundary. As shown in FIG. 3, and in accordance with the exemplary embodiment of the invention, image data 300 corresponding to an image of an inspected object includes both image data 310 resulting from blob analysis and image data 320 resulting from edge detection analysis. As explained below in more detail, edge detection image data 320 is used to replace the blob boundary image data 310, as it is generally more reliable. This may be done by substituting detected edge data, e.g., edgelets, for blob boundary data 310 if the detected edge data 320 is close enough to the blob boundary image data 310. When there are regions 330 of the image data 300 that lack image data 320 resulting from edge detection analysis, blob boundary data 310 may be used to provide image data for the detected object.

As shown in FIG. 2, the method begins at 200 and control proceeds to 205. At 205, image data corresponding to an image of an inspected object is acquired, e.g., using a camera and system illustrated in FIG. 1. Alternatively, the image data may be pre-generated and stored in a memory, which may be accessed at 205. Control then proceeds to 210, at which segmentation threshold parameters are acquired for use during subsequent blob analysis segmentation. Segmentation threshold parameters may include, for example, minimum blob size, morphological operations to be performed (as explained below) fixed threshold and/or automatically computed thresholds such as WGV. Control then proceeds to 215.

At 215, segmentation is performed on the acquired image data to distinguish the pixels representing the inspected object from the pixels representing the background of the image. Segmentation is the division of the pixels in an image into object pixels and background pixels. As mentioned above, thresholding is segmentation performed by picking a simple threshold value; pixels on one side of the threshold are object pixels, those on the other side are background pixels.

The process of segmenting an image is the most unpredictable and difficult aspect of blob analysis, particularly when confronted with wide image-to-image variation in image contrast and in the number of blobs. If the shapes of objects and/or object features is not known prior to runtime, it is often difficult to tailor a segmentation approach to the optimally segment the object from the background or object features from the object itself. It is foreseeable that a priori pattern data of the background of an image may be known prior to runtime and acquired as part of the blob segmentation parameters.

Although not shown, it is foreseeable that following segmentation, the segmented image data may be converted into run-length encoded (RLE) image data. As mentioned above, run-length encoding is an encoding technique that takes advantage of the fact that most segmented images contain large numbers of adjacent pixels with the same pixel value. Runs of pixels with the same pixel value are stored as a pixel value and a run length. The resulting RLE image data has a number of advantages when compared with an unencoded image, e.g., less storage is required for a given image and blob analysis operations can be performed more quickly on an RLE image data than on an unencoded image.

It should be appreciated that a number of image-processing operations (also not shown in FIG. 2) may be performed before, during and after encoding the image data as an RLE image data. For example, masking may be performed by applying an arbitrarily defined mask to exclude portions of image data from blob analysis. Masking may be used to remove image data corresponding to features of an image that would make segmenting the image difficult or impossible. Morphological operations can also be applied to image data to accentuate or minimize particular types of features within the corresponding image, e.g., grey-scale morphology (the process of applying a simple operator to successive neighborhoods of pixels within an image).

Following segmentation, any optional but desired encoding and morphological operations, control proceeds to 220. At 220, blob analysis is performed with a size threshold to identify objects and/or object features within the image data. The output of the operations performed at 220 is blob boundary data.

Control then proceeds to 225, at which edge detection parameters are acquired to perform on the image data in the bounding box, i.e., region of interest or neighborhood, of each of the identified objects and/or object features. The edge detection parameters may include, for example, one or more magnitude and/or length thresholds, minimum edge chain length and granularity. It is foreseeable, that edge detection may be performed to find "large" marks, i.e., those marks that are long, e.g. significant, or strong, e.g., distinctive from the image data within the mark's neighborhood.

Thus, the edge detection parameters may include both magnitude threshold data and length threshold data.

Note that a chain length threshold may be ignored for "short" chains, which "begin" and "end" near edges of sufficiently long different chains. In other words, if the first and last edges of a short chain are sufficiently close to different chains that satisfy the minimum chain length criterion, the shorter chains may be accepted even though they do not satisfy the minimum chain length criterion.

Control then proceeds to 230, at which edge detection data is collected into edge chains using one or more different length and/or magnitude thresholds. Edges may be collected by using one or more different length/mag thresholds, e.g., Magnitude=20, length=30 and/or Mag=40, length=13. In edge detection, some detected edges may be discarded or ignored based upon their contrast magnitude, i.e., keep high contrast edges and prune (i.e., discard or ignore) low contrast edges.

Alternatively, or in addition hysteresis magnitude thresholding may be applied to the data resulting from the operations performed at 225. In hysteresis magnitude thresholding, an assumption is made that edges are already grouped into chains. For each chain, the maximum magnitude of any edge of the edge chain is computed. In other words, based on a minimum chain length or identification of detected edge data being a closed chain, each of the identified edge chains may be reviewed to determine if at least one of the edges in each chain has a magnitude that is higher then one threshold and all of them are higher than a second threshold. For example, if every edge in a chain has an edge magnitude greater than a minimum edge magnitude threshold and the chain's magnitude is greater than the minimum chain magnitude threshold, then all edges are kept with the edge chain; otherwise, edges are pruned, i.e., discarded or ignored, from the edge chain.

In such a way, hysteresis magnitude thresholding may be used in conjunction with chain length thresholding. Therefore, if an edge chain's length is less than a specified size and the chain is not closed, all the edges in the chain are pruned, i.e., discarded. However, as explained above a chain length threshold may be ignored for "short" chains, which "begin" and "end" near edges of sufficiently long different chains, e.g., if the first and last edges of a short chain are sufficiently close to different chains, which satisfy the minimum chain length criterion. Therefore, shorter chains may be accepted even though they do not satisfy the minimum chain length criterion. This may be implemented by performing pruning in two passes: a first phase, in which all the edge chains which definitely satisfy the contrast and length criteria are located, and a second phase in which all of the edge chains which did not satisfy the length criteria are analyzed to determine if they are sufficiently close to edges on two different chains which were accepted in the first phase.

Because of the defects present in most images, such as video noise, even after segmentation and masking, images can contain undesired features. One technique that can be used to remove small features from an image is feature pruning and filling.

It is possible to ignore all features (both blobs and holes) below a certain size. As mentioned above, this is called image pruning. When an image is pruned of all features below a certain size, the blob that enclosed the pruned features is computed as though the pruned features still existed, but the pruned features themselves are not counted as children of the enclosing feature. For example, if an image that contains one blob with an area of 900 pixels that contains 8 holes, each with an area of 10 pixels, is pruned using a minimum feature size of 20 pixels, Blob analysis reports the presence of a single blob with an area of 900 pixels.

It is also possible to fill in the space occupied by pruned features. This is called filling the image. In the case of labeled connectivity, the feature being filled is filled in with pixels with the same label as the enclosing blob. In the case of greyscale connectivity, the pixel value that is used to fill the feature is the value of the pixel to the immediate left of the feature being filled. As each row of pixels in the feature is filled, the pixel value to the immediate left of that row of pixels is used as the fill value for that row.

The collection of edge detection data may be performed differently depending on the type of connectivity analysis being performed. The output produced at 230 may be a blob scene description that contains all information about the blobs in the image. Regardless of how the image was segmented, the same technique is used to connect pixels into blobs.

Using greyscale connectivity analysis, a blob is defined as a group of connected object pixels, where an object pixel is any pixel with a nonzero weight. Greyscale connectivity analysis defines object connectivity in terms of 8-connectedness; that is, all object pixels bordering a given pixel's edges, as well as those touching its corners, are considered to be connected to that pixel. Because object pixels are 8-connected, background pixels are 4-connected; that is, background pixels are not considered to be connected diagonally. All features in the image, whether they are blobs or holes, are stored in their own RLE images. These images can then be used for other purposes.

In the case of labeled connectivity analysis, a blob is defined as a group of connected feature pixels, where each pixel has the same label. Because the division of features into objects and background does not apply to labeled connectivity analysis, labeled connectivity is performed in terms of 6-connectedness.

Figure 4:
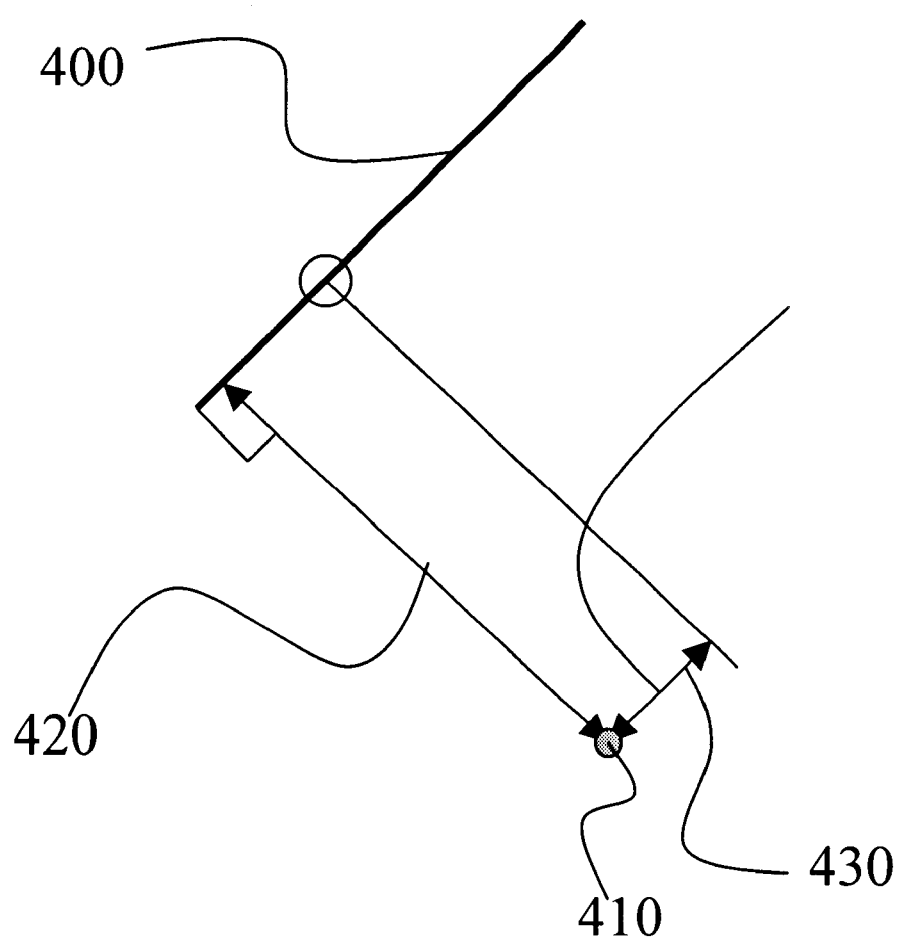
FIG. 4 is an exemplary illustration of a graphical relationship between an edgelet and blob boundary data.

Following the operations performed at 230, control then proceeds to 235, at which the output produced by the operations at 230 (detected and collected edge data in the regions/neighborhood/bounding box around the detected objects and/or object features) are snapped to the blob boundary data generated at 220. This may be done by substituting detected edge data, e.g., edgelets, for blob boundary data if the detected edge data is close enough. As explained with reference to FIG. 4, the distance between an edgelet 400 and a blob boundary point 410 may be calculated as a measured error. This measured error may be based on the perpendicular distance 420 and the tangential distance 430 between the edgelet 400 and the blob boundary point 410, e.g.:

Measured error=Perpendicular Distance+(max(0, Tangential distance−0.5))$^{2}$, where "max" is the maximum value of all of the arguments, max(a,b)=a if a>b and b otherwise. This measured error may be compared with a predetermined threshold to determine whether the edgelet 400 may be substituted for the blob boundary point 410.

A determination of how close the edgelets are to the blob boundary data may be performed based on any number of proximity determination algorithms. For example, an algorithm as shown in the Appendix of this disclosure may be used to identify the proximity of blob boundary data produced at 220 and edge detection data produced at 230. According to the exemplary embodiment of the invention, the edge chains are processed in such a way to keep them "intact" if possible.

Control then proceeds to 240, at which edge data is sorted so that it forms a boundary around the detected objects/features, for example, objects/features meeting or exceeding a specified size or intensity magnitude. It is foreseeable that operations performed at 240 may also separate edge chains into separate object/features. This sorting may be performed by using the edges using the boundary, e.g., swap "nearby" edges if it improves the overall order of the boundary list. Sorting may follow the edge chains, which means that the measured boundary may be analyzed to determine if an edge belonging to the same chain may be substituted for current boundary points.

Alternatively, sorting may follow the blob boundary data, which means that the edge chains may be analyzed to determine if blob boundary data may be substituted for edges belonging to the same chain. Note, for "closed" chains, the edge matching operations may be omitted and the entire closed chain may be accepted as accurate.

It is foreseeable that additional operations may be performed to provide closed edge chains from chains that were not found to be closed. For example, the operations may include a determination of whether there are any "loose ends" of chains (e.g., generated because there was a vertex intersection of three chains and the chaining algorithm can only follow one chain at a time). One potential problem with conventionally resolving edges involves vertices with three edges. Sometimes, three edges join at a single point. In such situations, the conventional edge detection technology and chaining algorithms can return anomalous results. Consider the letter "b". One way to chain the outline would be a small closed boundary at the bottom, and a vertical chain emanating up from the middle vertex. Alternatively, the chaining algorithm can start at the middle vertex, and trace the boundary creating a single open chain. Using only edge information, it is much easier to determine the extent of the object/feature region in the former case than the latter case.

It is foreseeable that, edge detection analysis may also include operations for separating chains into closed loops and ignoring any chains contained inside any other chains. This technique may be effective at closing edge chains because features, e.g., probe marks, may sometimes have a white center, which can induce edge chains and blob boundaries. Alternatively, or in addition, another technique for closing un-closed chains may involve identifying nearby endpoints (e.g., less than two pixels distance from edges of the other end of the chain.

Sorting of edges around the boundary may involve considering all adjacent pairs of edges, the former edge and the latter edge to determine whether placement is appropriate. Whenever edges are swapped (location) or deleted, all the edges may be reprocessed to determine the effect. If two edges are the same edge, one of the copies may be deleted. If the edges are from the same chain, and the index along the chain of the former edge is greater than the index along the chain of the latter edge (but the index of the former edge does not exceed the index of the latter edge by too much), then the order of edges may be swapped. If the edges are oriented in the same direction, and the latter edge is to the left of the former edge, then the edges may be swapped, e.g., if the edge order was {a,b,c,d,e}, {d} may be swapped with {e} so that the edge order becomes {a,b,c,e,d}.

It should be appreciated that the "area" of a closed chain may also be considered as compared to the area of a segmented region to determine whether to omit edge-matching operations.

Following whatever operations are included to sort and substitute either edge data or blob boundary data, control then proceeds to 245 at which the method ends.

Following performance of the operations illustrated in FIG. 2, it is foreseeable that the information may be stored and/or output to an operator or a machine vision application that may use the output data in some meaningful way. Alternatively, or in addition, measurements of the regions bounded by the edge chains, e.g., area, center of mass, inertia matrix, boundary length, etc., may be made and output to other applications and/or an operator.

Data may be output to an operator in the form of a blob scene description, which is a data object that provides access to all the information about all features in the scene, including the number of features (blobs and holes), the topological relationship among the features, and the geometric and nongeometric properties of each feature. In addition, the blob scene description also provides a number of computed blob measures based on blob attributes.

Within a blob scene description each feature (blob or hole) is uniquely identified by an identification code. Identification codes are integers in the range 1 to the number of features in the scene. Certain kinds of information can be obtained regarding the collection of blobs to which the blob scene description refers. Other kinds of information are also available for each blob in the scene.

The blob scene description can provide access to a tree structure that describes the label and topological relationship of each feature in the scene. The topological information available about a blob scene as a whole may include the number and identification codes of all top-level features (those features that are not enclosed by any other feature in the scene) and the total number of features within the scene. For each feature in the scene, the topological information may include the label of the feature(e.g., in the case of grey-scale connectivity, the label is 0 for holes and 1 for blobs; in the case of labeled connectivity, the label is the feature's label), the number and identification codes of the feature's child features (those features completely and directly enclosed within this feature), the identification code of this feature's parent feature (the feature that directly encloses the feature), and the number and identification codes of this feature's sibling features (any other features which are directly and completely enclosed within the same feature that directly encloses this feature).

For each feature in the scene the blob scene description contains a chain code that describes the path around the outside edges of the outermost pixels that make up this feature. The chain code includes a sequence of direction codes (up, down, left, right) that, when taken as a sequence, describe the perimeter of the feature.

For each feature within the scene, geometric measures may be output that includes area, perimeter, center of mass, principal axes, second moments of inertia about the principal axes and geometric extents. Nongeometrical information for each of the features may include median about any axis, second moments of inertia about any axis through the center of mass, coordinate extents about any axis, and bounding box about any axis. Blob analysis may also allow an operator to compute the size and location of a bounding box oriented with respect to a line drawn at an arbitrary angle through the center of mass. Computed measures available for each blob may include measurements of a circularity, elongation, and aspect ratio.

Output from the operations performed at 240 may be objects/features data output in terms of a generic "boundary contour" class. The boundary contour class may provide measurement functions (bounding box, area, inertia matrix, center of mass) for each of the boundaries. The boundary contour class may also provide utility functions such as "is the following point INSIDE the boundary contour" or "are any of the connected points INSIDE the boundary contour" or "does the boundary contour intersect the given chain of points". The boundary contour class may be derivable (e.g., it may have a virtual destructor function).

Methods and systems designed in accordance with the exemplary embodiment of the invention may provide an object and/or object feature detection tool that is a general-purpose tool, not tailored towards any particular inspection application. The output structures for the systems and methods may be designed so as to facilitate post-processing of the generated result data. For example, methods and systems designed in accordance with the exemplary embodiment of the invention may be incorporated or used in conjunction with a probe mark inspection application, which may use it to measure probe marks. Probe mark inspection-specific functionality may be implemented using the results of (on top of) the object/feature detection tool designed in accordance with the exemplary embodiment of the invention.

The operations performed at 210–220 and 225–230 are performed in parallel rather than sequentially. The operations performed at 210–220 and 225–230 may be performed so that edge detection is performed prior to blob boundary analysis.

Figure 5:
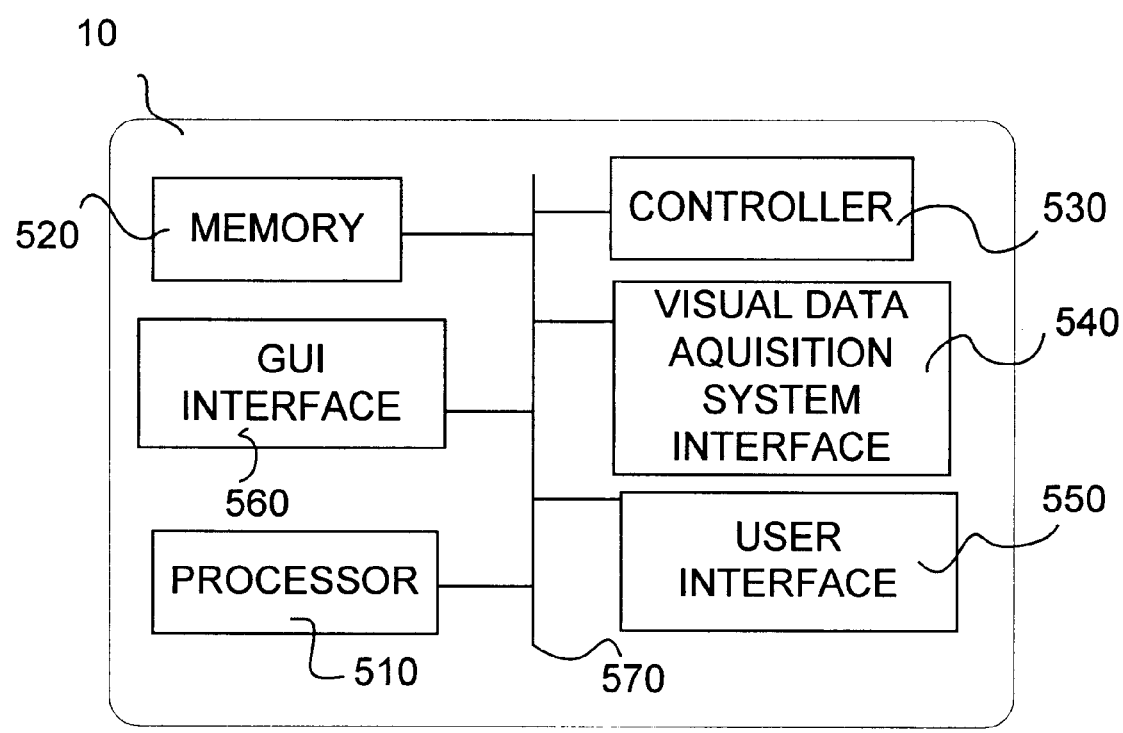
FIG. 5 is a functional block diagram of one implementation of the machine vision system 10 illustrated in FIG. 1.

FIG. 5 is a functional block diagram of one implementation of the machine vision system 10 illustrated in FIG. 1. As shown in FIG. 5, the machine vision system 10 may include a processor 510, a memory 520, a controller 530, a visual data acquisition system interface 540, a user interface 550, a GUI interface 560 and a communication/data/control bus 570 that couples elements 510–560 together and allows for cooperation and communication between those elements.

The memory 520 may be preferably implemented with a sufficient quantity of RAM, for example, 32 to 64 megabytes.

The visual data acquisition system interface 540 may include both hardware and software to allow the system 10 to communicate with a visual data acquisition system, which may include, for example, camera 16 illustrated in FIG. 1.

Processor 510 works in cooperation with the controller 530 to control operation of the other elements 520 and 540–570. In cooperation with the controller 530, the processor 510 may fetch instructions from memory 520 and decode them, which may cause the processor 510 to transfer data to or from memory 520 or to work in combination with the user interface 550 (for example, to input or output information), the visual data acquisition system interface 540 (for example, to input image-data from or output instructions to the visual data acquisition system), or the GUI interface 560 (for example, to provide inspection information to the user via, for example, the display 18), etc.

The processor 510 may actually be implemented as dual processors. Such a configuration may be preferable, for example, if the operations performed at 210–220 and 225–230 are performed in parallel rather than sequentially.

Controller 530 operates to control operation of the other elements 520 and 540–570 of the system 10. It should be appreciated that the controller 530 may be implemented with the processor 510, for example, in a central processing unit, or other similar device.

The user interface 550 may include, for example, hardware and software for cooperating with the display 18, a keyboard and mouse, etc. Moreover, the user interface 550 may include a speaker and microphone, not shown, for outputting and inputting information to and from a user. The user interface 550 may operate in conjunction with the processor 510 and controller 530 to allow a user to interact with software programs stored in the memory 520 and used by the processor 510 so as to perform the operations illustrated in FIG. 2.

The machine vision system 10 can be implemented, for example, as portions of a suitably programmed general-purpose computer. The system may be implemented, for example, as physically distinct hardware circuits within an ASIC. The particular form of the system 10 can be different. For example, although the system 10 has been described as a general-purpose computer, for example, a personal computer, it is foreseeable that the system 10 may be a special purpose embedded processor.

The systems and methods described herein may be able to accept various levels/types of input, for example, blob boundary and edge chain data, blob result data and edge detection parameters and image data, blob analysis parameter data and edge detection parameter data.

Additionally, it should be understood that the systems and methods designed in accordance with the exemplary embodiment of the invention may be able to detect and identify multiple marks and marks within marks, even if it is specifically given a single blob boundary. Also, systems and methods may be able to tolerate repeated edge chains, for example, when an operator is interested in running edge detection at various resolutions, thresholds, and/or edge chain constraints.

The object and/or object feature detection systems and methods may also be able to ignore "expected" edges or sub-chains of edges (edges or sub-chains of edges of specific orientations at particular locations). These edges may correspond to background patterns known beforehand. These "expected edges to be ignored" may be characterized as masks.

The method and system may be able to handle objects/features including dark-on-light objects/features, light-on-dark objects/features and nested objects/features.

The method and system may include global functions, e.g., edge detection, which may construct/produce an object/feature inspection tool result set object containing individual object/feature inspection tool result objects. Object/feature inspection tool result member functions may be used for making measurements on found objects/features (the measurements may be cached once computed). Both of these functions may be static to the class.

It is also important to appreciate that significant differences exist between the exemplary embodiment of the invention and conventional snake-technology (see, for example, Geiger, Davi, et al., "Dynamic Programming for Detecting, Trading and Matching Deformable Contours", IEEE Transactions on Pattern Analysis and Machine Intelligence, Vol. 17, No. 3, March, 1995; and Gunn, Steve R., et al. "A Robust Snake Implementation; A Dual Active Contour", IEEE Transactions on Pattern Analysis and Machine Intelligence, Vol. 19, No. 1, January, 1997). For example, the exemplary embodiment of the invention uses non-maximally suppressed edges (i.e., the outline of the scene). Most snake approaches use an error metric, which includes the grey-level and contrast at each point on the boundary. However, snake approaches do not require that the boundary points be the peak edges of the outline.

The exemplary embodiments of the invention may also be used in combination with 3D volume data, run segmentation on 3D dataset, edge detection and other machine vision tools.

It should be appreciated that the methods and systems may analyze image data included in multiple images, for example, grey level-based segmentation analysis and edge detection analysis may be performed on image data included one or more images, e.g., grey level-based segmentation analysis may be performed on image data from a first image of a sample object and edge detection may be performed on a image data from a second image.
©2000, Cognex Corporation

Appendix A

```
double minDistance=DBL_MAX;
double maxDistance=3; // distance at which we consider the blob boundary because there are no edges
for (int k=0; k<cur->second.size( ); ++k) // for (all edges nearby a blob boundary point)
{
  j=cur->second[k]; // for each candidate edge
  cc2Vect pos(edges[j].posQuickX( ), edges[j].posQuickY( ));
  cc2Vect diff=boundaryPoints[i]+cc2Vect(0.5,0.5)-pos;
  cc2Vect grad=edges[j].gradient( );
  double tanDistance=fabs(diff.cross(grad));
  double perpDistance=fabs(diff.dot(grad));
  double tmp=cfMax(0.,tanDistance-0.5);
  double dist=perpDistance+tmp*tmp;
  if (fabs(dist)<minDistance)
    {
    minDistance=fabs(dist);
    closestEdge=edges[j];
    }
}
if (minDistance>maxDistance)
closestEdge=
ccPMIEdgelet(ccEdgelet(boundaryPoints[i]+cc2Vect(0.5,0.5),0.,ccDegree(45)));
ans.push_back(closestEdge);
}
return ans;
}
```

While the invention has been described with reference to the certain illustrated embodiments, the words which have been used herein are words of description, rather than words or limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and materials, such as are within the scope of the appended claims.

I claim:

1. An image data analysis method comprising:
acquiring image data corresponding to a sample-object;
generating boundary points of at least one segmented region by performing grey level-based segmentation analysis on the image data;
generating edge data by performing edge detection on the image data; and
computing a boundary description of the at least one segmented region by comparing the locations of edge data and boundary points of the at least one segmented region, wherein the boundary description includes edge data rather than boundary points of the at least one segmented region when the edge data is sufficiently close in proximity to the boundary points of the at least one segmented region.

2. An image data analysis method comprising:
acquiring image data corresponding to a sample-object;
generating boundary points of at least one segmented region by performing grey level-based segmentation analysis on the image data;
generating edge data by performing edge detection on the image data; and
computing a boundary description of the at least one segmented region by comparing the locations of edge data and boundary points of the at least one segmented region, wherein computing the boundary description is performed by substituting data contained in edgelets in the edge data, for boundary points of the at least one segmented region.

3. An image data analysis method comprising:
acquiring image data corresponding to a sample-object;
generating boundary points of at least one segmented region by performing grey level-based segmentation analysis on the image data;
generating edge data by performing edge detection on the image data; and
computing a boundary description of the at least one segmented region by comparing the locations of edge data and boundary points of the at least one segmented region and the boundary description includes boundary points of the at least one segmented region when the edge data is not sufficiently close in proximity to the boundary points of the at least one segmented region.

4. The method of claims 1, 2, or 3, wherein boundary points of the at least one segmented region is generated by performing blob boundary analysis on the obtained image data.

5. The method of claims 1, 2, or 3, wherein the boundary points of the least one segmented region is generated by performing running grey-scale connectivity analysis.

6. The method of claims 1, 2, or 3, wherein edge data is generated by performing true peaked edge detection.

7. The method of claims 1, 2, or 3, wherein the image data is generated by operation of a camera and stored in a memory, which is accessed during acquisition of image data corresponding to the sample-object.

8. The method of claims 1, 2, or 3, further comprising acquiring blob boundary segmentation threshold parameters.

9. The method of claim 8, wherein the blob boundary segmentation threshold parameters include at least one of minimum blob size, morphological operations to be performed, fixed threshold and automatically computed thresholds.

10. The method of claim 8, wherein the boundary points of the at least one segmented region is generated by performing segmentation using the blob boundary segmentation threshold parameters on the obtained image data to distinguish the pixels representing the inspected object from the pixels representing a background of the image.

11. The method of claim 10, wherein the segmentation utilizes a thresholding technique that identifies a particular pixel as an object pixel or a background pixel based on comparison of a grey level value of the particular pixel and a grey level threshold value.

12. The method of claims 1, 2, or 3 further comprising applying an arbitrarily defined mask to exclude portions of the image data from analysis using grey level-based analysis and edge-based analysis.

13. The method of claims 1, 2, or 3 further comprising performing at least one morphological operation on the image data to accentuate or minimize particular types of features.

14. An image data analysis method comprising:

acquiring image data corresponding to a sample-object;

generating boundary points of at least one segmented region by performing grey level-based segmentation analysis on the image data;

generating edge data by performing edge detection on the image data; and computing a boundary description of the at least one segmented region the step of computing including snapping edge-based image data to the boundary points of the at least one segmented region by substituting detected edgelets in the edge data for boundary points of the at least one segmented region if the edgelets are close in geographical proximity.

15. The method of claim 14, further comprising sorting the computed boundary description so that it forms a boundary around detected objects or object features.

16. The method of claim 14, further comprising storing the computed boundary description in a memory.

17. The method of claim 14, further comprising outputting the computed boundary description to an operator via a user interface.

18. The method of claim 14, further comprising outputting the computed boundary description to a machine vision application.

* * * * *